Figure 1:
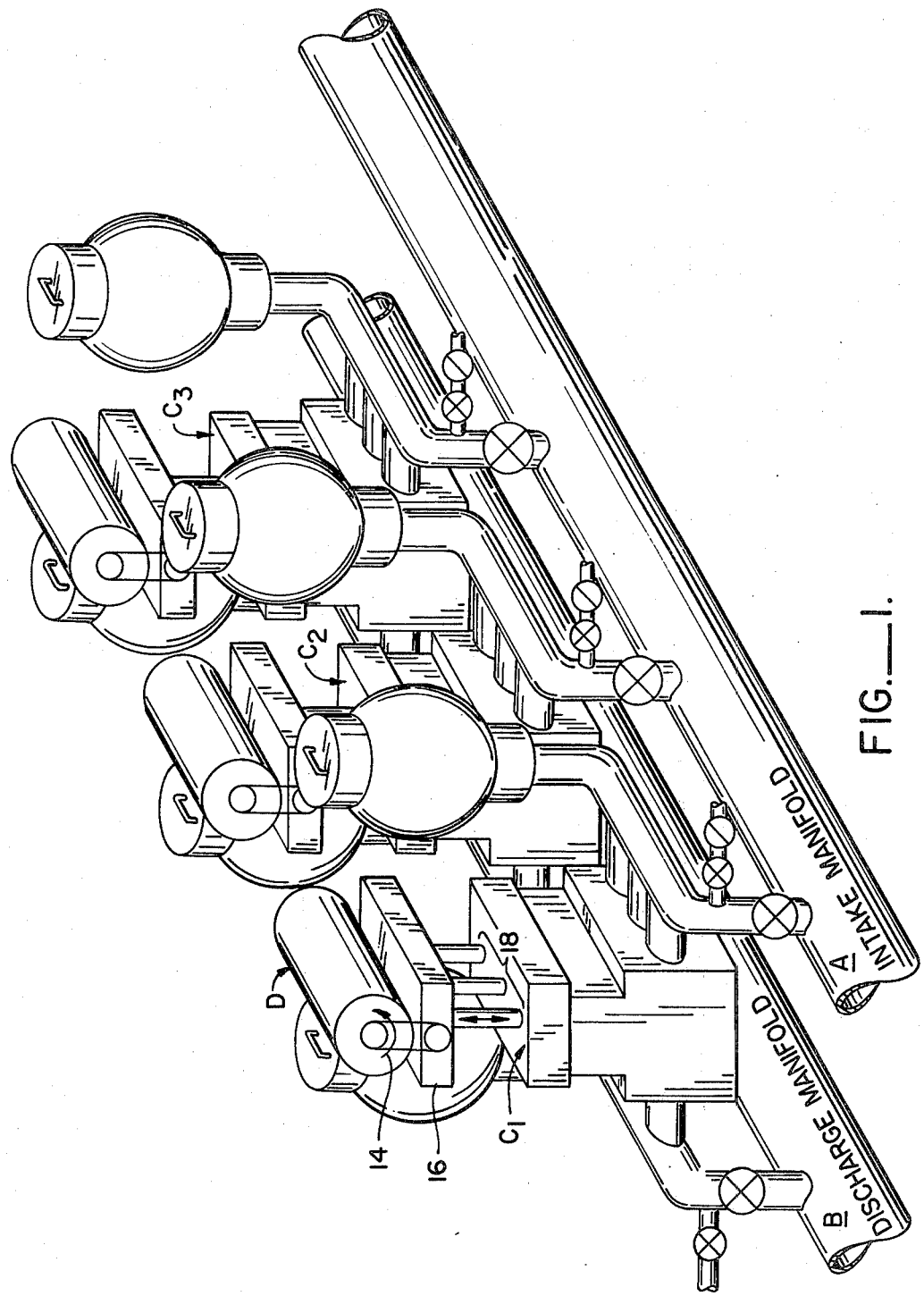

United States Patent [19]
Aude

[11] 4,177,016
[45] Dec. 4, 1979

[54] SELF CLEANING MANIFOLD CONNECTION FOR SLURRY PUMP

[75] Inventor: Thomas C. Aude, Orinda, Calif.

[73] Assignee: Bechtel International Corporation, San Francisco, Calif.

[21] Appl. No.: 896,964

[22] Filed: Apr. 17, 1978

[51] Int. Cl.² ............................................. F04B 39/00
[52] U.S. Cl. .................................... 417/53; 417/539; 417/542; 417/430; 417/432
[58] Field of Search ............... 417/430, 539, 435, 568, 417/53

[56] References Cited

U.S. PATENT DOCUMENTS

| | | | |
|---|---|---|---|
| 3,298,319 | 1/1967 | Savage | 417/430 |
| 3,619,087 | 11/1971 | Beeman | 417/568 |
| 3,802,807 | 4/1974 | Kilayko | 417/435 |

FOREIGN PATENT DOCUMENTS

| | | | |
|---|---|---|---|
| 9389 | of 1911 | United Kingdom | 417/430 |
| 222166 | 10/1968 | U.S.S.R. | 417/430 |

*Primary Examiner*—William L. Freeh
*Attorney, Agent, or Firm*—Townsend and Townsend

[57] ABSTRACT

One or a plurality of positive displacement slurry pumps are connected to common intake and discharge manifolds at a typical slurry pipeline pumping station. Each pump is connected at its inlet by inlet piping from the intake manifold through an intake isolation valve with a flushing water inlet between the intake isolation valve and the pump. Similarly, each pump is connected at its outlet by outlet piping to the outlet manifold through an outlet isolation valve with a pump drain between the outlet isolation valve and the pump. Conventional pulsation dampeners are connected to the piping at least at the pump outlet and communicate a volume of gas under pressure to the pump for dampening of shock waves. The inlet and outlet piping has a pipe length and slope between the pump on the high side to the station intake manifold and to the discharge manifold on the low side. Settlement of virtually all of the particulate matter of the slurry clear of the intake and discharge isolation valves occurs when the pump is off.

7 Claims, 2 Drawing Figures

SELF CLEANING MANIFOLD CONNECTION FOR SLURRY PUMP

This invention relates to piping connected to slurry pumps and more particularly relates to piping apparatus and methods which enables one or more of a plurality of slurry pumps within a pumping station to be shut down with a minimum of operating steps and isolated without undue valve wear.

DESCRIPTION OF THE PROBLEM

The transport of particulate matter in slurry form, such as coal, iron, copper and limestone, is known. Typically, one or more pump stations is placed along the length of a slurry pipe line to maintain the desired flow rate of the slurry under varying conditions. Each station typically consists of a plurality of pumps connected across common station intake and discharge manifolds. For example, seven such pumps (six operating at one time and the other on standby) having 8-inch outlets can be connected across 20-inch inlet and outlet manifolds in a pumping station. This invention is addressed to the abrasive problems one encounters when one or more pumps at a station are stopped or started during otherwise continuous slurry pipeline operation, as for maintenance, and to simplify the operating steps involved.

Typically, each slurry pump is connected at its intake to the station intake manifold and at its discharge to the station discharge manifold. Piping to the intake of such pumps includes an isolation valve and a flush valve between the intake manifold and the pump. Likewise, the piping from the pump to the discharge manifold includes a drain valve and an isolation valve between the pump and the discharge manifold.

With such positive displacement pumps, pulsation dampening is often required to dampen fluid shock waves in the pumping system and avoid the otherwise attendant shock problems. In many systems, two gas filled dampeners are used with each pump, one dampener for the intake slurry to the pump and the other for the outlet slurry from the pump.

SUMMARY OF THE PRIOR ART

Heretofore, conventional inlet and outlet piping connecting such pumps with the manifolds has not been plumbed to avoid slurry settlement at or near isolation and drain valves. Lengths of horizontal pipe have been used, requiring isolation and flushing of a pump after each shutdown.

First, such pumps have required valve manipulation to bring the pumps on line. Typically, the intake isolation valve is opened to let the slurry into the pump. Thereafter, flow through the drain valve on the discharge side of the pump occurs until flow of slurry appears at the drain. Then, the drain valve is closed, the discharge isolation valve is opened, and the pump is brought on line.

This valve manipulation has caused excessive valve wear. Consider the case immediately before the discharge isolation valve is opened. At this time the drain valve must be closed against a flow of slurry containing particulate matter. Rapid abrading of the drain valve seat by the passing particulate matter occurs resulting in unacceptable leakage.

Moreover, desposition of solid particles can occur through settlement in the intake and discharge manifold piping when a pump is isolated. When the pump is restarted, the solid particles tend to move en masse with the accelerated water, causing abrasion to the valves and piping, and also often causing downstream blockage at any constriction in the pipeline.

Moreover, the opening of isolation valves to charge the pulsation dampeners with pressure has additionally caused problems. Specifically, the abrading slurry, in passing the isolation valves as these valves are "cracked" or first opened at a small degree, causes abrading of the isolation valves from the particulate matter in the slurry with eventual leakage across the isolation valve. This condition is especially aggravated across the high pressure differential at the discharge isolation valve as it is opened. Since the isolation valve places the entire discharge side of the pump under the relatively high discharge pressure of the station discharge manifold, it is not possible to repair pumps with a leaking discharge isolation valve without closing an entire pumping station. Closing down an entire pumping station can require an entire slurry line of many miles to be emptied of slurry.

SUMMARY OF THE INVENTION

One or a plurality of positive displacement slurry pumps are connected to common intake and discharge manifolds at a typical slurry pipeline pumping station. Each pump is connected at its inlet by inlet piping from the intake manifold through an intake isolation valve with a flushing water inlet between the intake isolation valve and the pump. Similarly, each pump is connected at its outlet by outlet piping to the outlet manifold through an outlet isolation valve with a pump drain between the outlet isolation valve and the pump. Conventional pulsation dampeners are connected to the piping at least at the discharge manifold and communicate a volume of gas under pressure to the pump for dampening of shock waves. Each inlet and outlet piping has a respective pipe length and slope between the pump on the high side to the station intake manifold and to the discharge manifold on the low side. Settlement of virtually all of the particulate matter of the slurry clear of the intake and discharge isolation valves occurs when the pump is off.

The apparatus of this invention permits slurry pump starting and stopping to occur without valve manipulation. Further, when valve manipulation is required (as for isolation of a pump or reconnecting of a pump) valve manipulation occurs against the fluid of the slurry only; almost all of the particulate matter of the slurry settles clear of the pump isolation valving to prevent abrading valves sealing surfaces.

The pump operating method of this invention enables pump starting and stopping without isolation valve manipulation. In starting a pump, speed control of the starting pump enables a pump to come on line without destroying the homogenous nature of slurry being transported. In stopping a pump, no speed control is required. When the pump is isolated, as for repair, the operating method of this invention merely requires that the pump be left in a stopped state for a sufficient period of time to allow particle settlement from the fluid of the slurry in the manifold and away from the vicinity of the pump isolation valving. Once particle settlement has occurred, isolation valving can be manipulated according to the method herein disclosed without significant valve abrasion.

OTHER OBJECTS AND ADVANTAGES

An object of this invention is to provide pump inlet and outlet piping so that positive displacement pumps in a slurry pipeline system can be isolated and then returned to use with a minimum of operating steps and without appreciable valve wear. According to the method and apparatus invention, all piping segments for the pump are provided with downwardly sloping lengths of line between the pumps inlet and outlet to the intake and discharge manifolds. When the positive displacement slurry pumps are in the stopped condition, the pumps themselves act as a check valve preventing the back flow of slurry from the high pressure discharge manifold to the pumps' lower pressure intake manifold. The sloping intake and discharge piping acts as an occluded or "dead end" zone permitting particle settlement away from the pump downwardly and into the moving slurry flow of the station intake and discharge manifolds. This settlement is to a level where the respective intake and discharge isolation valves see only fluid substantially clear of all particulate matter. Upon elapse of sufficient time, closing manipulation of the isolation valves may occur if maintenance operations are to be performed on the pump. Otherwise, the intake and discharge isolation valves may remain open while the pump is down. The isolation valves when closing encounter only fluid substantially free of all particulate matter. This particulate matter is settled to the station intake and discharge manifolds where the remaining station pumps in operation pass this particulate matter in normal slurry flow.

An advantage of this invention is that isolation valves can be closed against a fluid substantially free of particulate matter, which would otherwise abrade the isolation valves sealing surfaces.

A further advantage of this invention is that the drain valve on the discharge side of the pump between the pump discharge and the pump discharge isolation valve can be opened against fluid substantially free of particulate matter. Rapid abrading wear of this discharge valve does not occur, as has been common in the prior art, due to the release of the energy stored in the pulsation dampener in the form of a high velocity slurry stream across the drain valve.

A further object of this invention is to disclose inlet and outlet piping systems in which pump start up and stopping occurs without valve manipulation. According to this aspect of the invention, when a pump is stopped, it acts as an effective check valve preventing fluid back flow between the pressurized station discharge manifold and the lower pressure station intake manifold. Once fluid stoppage occurs across the pump, settlement of the slurry to the respective intake and discharge manifolds occurs as time lapses, thus eliminating the need to isolate and flush the pump.

When start up occurs by bringing the pump up to full speed over a predetermined period of time, the time depending on the length of the pipe connecting the pump to the respective station intake and discharge manifolds, the homogeneous nature of the slurry is substantially undisturbed. Consequently, it is not required to manipulate valves in sequence to fill the pumps with slurry to provide a homogeneous material from the station discharge manifold.

An advantage of this invention is that a slurry pump can be stopped and started without valve manipulation. As no valve manipulation is required, remote starting and stopping of a slurry pump from distant control points is simplified.

Yet another advantage of this invention is that the need to fill or charge a slurry pump with homogeneous slurry before the pump is placed on line is eliminated. By the expedient of bringing a pump on line at a programmed rate, substantial dilution of slurry passing through a pumping station does not occur.

A further object of this invention is to disclose a pump piping inlet and outlet wherein isolated pumps can be brought on line with little abrading of their isolation valves when such pumps have been taken off the line and their internal pressures completely relieved, as during routine maintenance. According to this aspect of the invention, each of the intake and discharge isolation valves is separated from the respective pump station intake and discharge manifolds by a vertical distance. This vertical distance is sufficient to form an occluded or dead end fluid zone which is settled free of the particulate matter in the slurry. When the pumps are reconnected to the respective intake and discharge pressures, the intake and discharge manifolds charge their respective pulsation dampeners with volumes of fluid under pressure. This charging, however, occurs through the "cracked" or just-opened isolation valves with these respective valves encountering only fluid from the occluded or dead end fluid zone substantially clear of the particulate matter of the slurry. Wearing of the isolation valves is thus reduced.

Another advantage of this invention is that routine lubrication and disassembly for cleaning or repairing of the isolation valves are less frequently required.

An additional advantage of this invention is that the life of the pulsation dampeners is prolonged. The method of valve manipulation herein exposes the pumps to less frequent wide pressure variations prolonging the life of the elastic parts.

Also, another advantage of this invention is that the life of the isolation valves is greatly lengthened.

Figure 2:
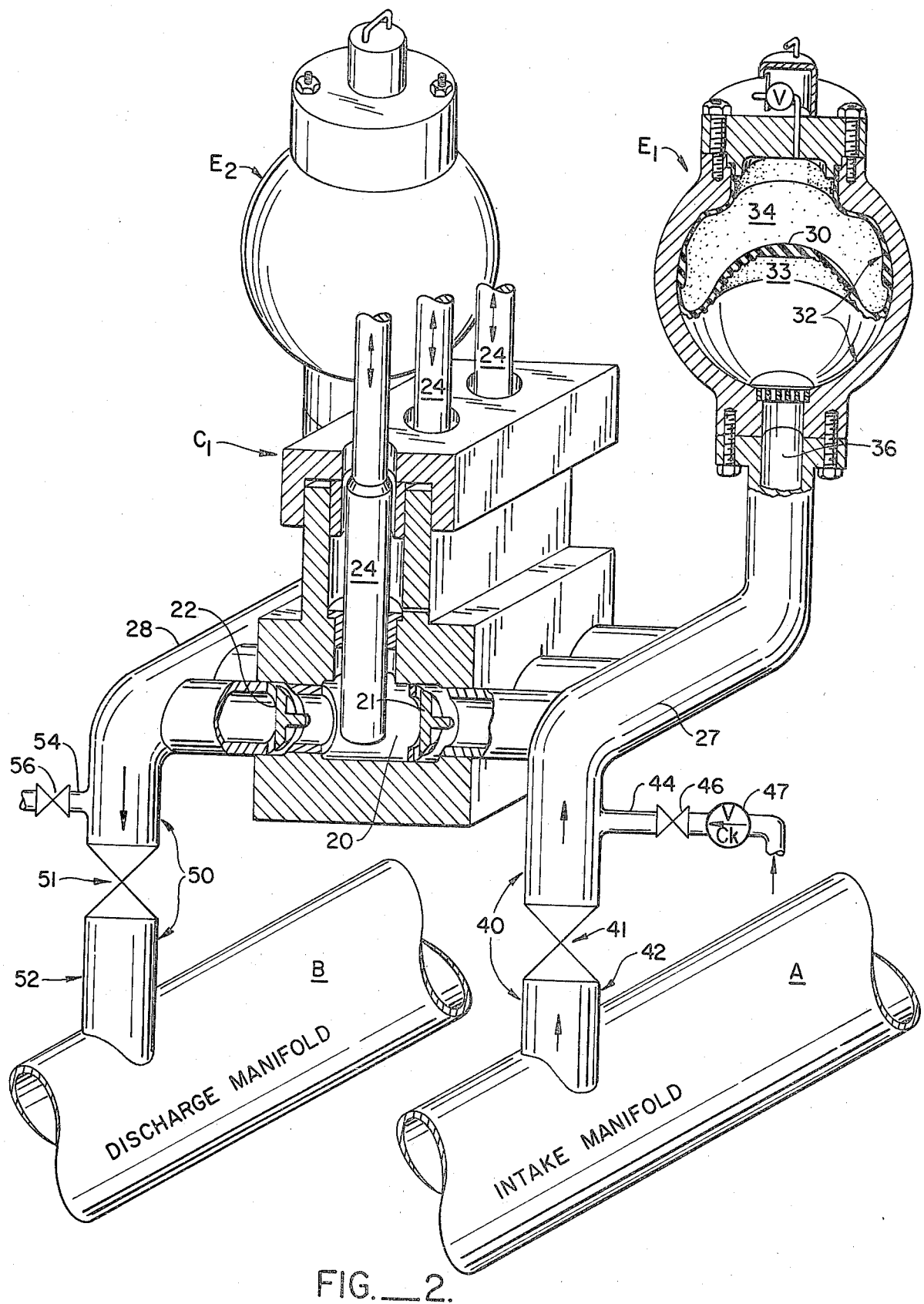

Other objects, features, and advantages of this invention will become apparent after referring to the following specification and attached drawings in which:

FIG. 1 is a perspective view of a typical pumping station showing a plurality of pumps between a station intake manifold and a station discharge manifold; and FIG. 2 is a typical detail of one of the station pumps illustrating the piping of this invention in a typical slurry pump.

Referring to FIG. 1, a pump station intake manifold A and a pump station discharge manifold B are shown. These respective manifolds have a series of pumps $C_1$, $C_2$, and $C_3$ connected across them.

Typically, manifolds A and B connect directly to a slurry pipeline. In the slurry pipeline there is typically a distance of miles (on the order of 25 to 150 miles) between pumping stations. The function of the series of pumps, $C_1$–$C_3$ between the intake and discharge manifolds is to supply moving pressure to the slurry in the pipeline. However, the intake manifold A may be connected to feed piping as in the most upstream station in a system or under some conditions to tankage at an intermediate pump station.

The slurry being transported can be any particulate matter capable of suspension within a moving liquid, typically water. For example, coal, chalk, iron, copper, phosphate and limestone are among the particulate matters which have been transported.

Referring to the detail of pump $C_1$ in FIG. 1, an electric motor D through a drive 14 furnishes power to a transmission 16. Transmission 16 functions to provide reciprocating motion to a group 18 of individual plungers 24, all of which will be illustrated with more particularity with reference to FIG. 2. Electric motor D, drive 14, transmission 16, and plungers 18 are all schematically shown.

Typically, the pumping station includes a plurality of such pumps. For example, where the respective manifolds and pipeline are in the order of 20 inches in diameter, seven pumps may be used. During such use, approximately six pumps may be utilized to drive the station at capacity, and the seventh or spare pump will be on a standby basis. This extra or spare pump can either be in a "standby" capacity or be isolated for required or routine maintenance. As has previously been emphasized, the invention herein is addressed to a piping system which enables such pump operations without undue pump valve wear.

Referring to FIG. 2, the construction of a typical pump—pump $C_1$—will be set forth. Thereafter, the piping connecting the pump to the intake manifold A and discharge manifold B will be set forth. Finally, the function of the piping in preventing undue valve wear during pump isolation will be discussed.

The particular positive displacement pump $C_1$ here illustrated is known in the prior art. Typically, a chamber is provided with an intake check valve 21 and an outlet check valve 22 (both of which are normally spring loaded). Each of the respective check valves 21 and 22 prevents the reverse movement of fluid under high pressure, as at discharge manifold A, towards and to the low pressure side of the pump, as at intake manifold B.

Typically, a reciprocating plunger 24 penetrates into and out of chamber 20 upon being supplied with a reciprocating motion from transmission 16 (transmission 16 being omitted from FIG. 2 for clarity). Positive displacement pumping occurs. Upon retraction of plunger 24, low pressure slurry enters from intake manifold A through check valve 21. Upon penetration of plunger 24 to chamber 20, slurry is forced outwardly through check valve 22 to discharge manifold B.

It will be noted that plunger 24 does not scour the sides of chamber 20. Rather it serves a displacing function; as the plunger changes the capacity of chamber 20, positive displacement pumping occurs.

Additionally, it is important to remember that respective check valves 21 and 22 prevent fluid back flow from the discharge manifold to the intake manifold when pump $C_1$ is in the off condition. Back flow through the illustrated positive displacement pump does not occur. More importantly, the respective piping to which each pump is connected becomes an essentially occluded or dead end zone of line from the respective intake and discharge manifolds A and B.

Referring to FIG. 2, each pump herein illustrated includes three plungers 24, each plunger 24 penetrating a separate chamber 20 with three respective check valves 21 and 22 connected to each of the respective chambers. By phasing the respective plungers in their up and down motion to approximately 120° phase intervals of reciprocating movement, both machine and fluid shock dampening can occur. However, the invention is equally applicable to other commonly available pumps with varying numbers of plungers or pistons, single or double acting, and either vertical or horizontal pumps.

Each respective pump has its own intake and discharge manifolds for connecting to each of the three chambers 20. In the case herein illustrated, individual pump intake manifold 27 permits the inflow of slurry to the three chambers 20; individual pump discharge manifold 28 permits the outflow of slurry from chambers 20.

Slurry, and indeed most liquids, are essentially not compressible. They therefore transfer fluid vibrations in the form of shock waves. It is well known that positive displacement pumps cause large shock waves. Such waves, if left unattenuated, cause inevitable damage to the piping in which the fluid is confined. Therefore, it is common to connect to both individual pump inlet manifold 27 and individual pump discharge manifold 28 to respective dampeners $E_1$ and $E_2$.

Discussion of dampeners $E_1$ and $E_2$ is believed instructive, as these respective dampeners largely cause the problems of the prior art. Specifically, the function of each respective dampener $E_1$ and $E_2$ is to contain a volume of gas, under pressure, which gas can be connected to and from the respective individual pump intake 27 and discharge manifolds 28. Typically, bellows or flexible diaphragm 30 divide a chamber in each respective dampener into an incompressible fluid side 33 and a compressible fluid side 34. For example, incompressible fluid side 33 can contain water; compressible fluid side 34 can contain nitrogen. Each dampener (take dampener $E_1$, for example) is connected by a conduit 36 to one of the individual pump intake manifolds 27 or 28. Where low pressure occurs in these manifolds, fluid will flow outwardly from the chamber 32. Where high pressure occurs in these manifolds, fluid will flow inwardly into chamber 32.

A shock wave constitutes the propagation of a pressure wave through the piping system. The flexible diaphragm dividing the chamber 32 attenuates pressure by compression or expansion of gas in portion 34 of chamber 32. Fluid movement at fluid side 34 occurs through fluid in the dampener absorbing the pressure "front". Attenuation through absorption of the energy of the resultant shock waves occurs.

When, however, the pump is shut down and isolated from the manifolds 27 and 28 by closing valves 41 and 51, each of the respective pressure pulsation dampeners $E_1$ and $E_2$ and manifolds 27 and 28 retains a high pressure. It is required that this pressure be relieved, as by bleeding the contents of the dampener through a drain valve, before the pump can be connected to atmosphere, as for repair. Moreover, when a pump is, after repair, placed "on the line" for operation, these respective pressure dampeners must be charged. They are charged with the respective operating pressures encountered in the station intake manifold A and discharge manifold B. Again, volumes of fluid must flow into the respective manifolds 27 and 28 through the isolation valves 41 and 51. Naturally, if particulate matter is in such charging fluid, abrading of the valve sealing surfaces can occur.

Having set forth the function of the pump and associated pressure pulsation dampener, the inlet and outlet piping to respective station intake manifold A and discharge manifold B can now be discussed.

Individual pump intake manifold 27 connects through a length of intake piping 40 to intake manifold A. Typically, this piping is interrupted by an intake isolation valve 41, commonly of the rotating plug variety. It is an important feature of this invention that intake isolation valve 41 be located above intake manifold A in a length of vertical or steeply inclined pipe 40. The function of this length of pipe is to form an occluded or isolated volume or zone sloping to intake manifold A to permit particulate matter settlement into intake manifold A when individual pump $C_1$ is not in operation.

Between intake isolation valve 41 and individual pump intake manifold 27, a flushing inlet 44 is placed. Typically, flushing inlet 44 includes a flushing inlet valve 46 and a check valve 47. Flushing inlet valve 46 permits fluid without particulate matter—such as clear water—to be connected to the pump, so that it may be filled with fluid after maintenance. Check valve 47 is a safety precaution. It typically prevent the back flow of slurry from the intake manifold 27 and pump station intake manifold A into the flushing water system.

The discharge piping is analogous. Typically, a section of pipe 50 is interrupted by a discharge isolation valve 51, again commonly of the rotating plug variety. A drain line 54 interrupted by a drain discharge valve 56 connects to piping 50 between discharge isolation valve 51 and discharge manifold 28. A length of vertical or steeply sloping pipe 50 forms an occluded or isolated extension from and above station discharge manifold B. This occluded section of line 50 permits the settlement of particulate matter from slurry into the discharge manifold B when slurry does not move through the individual pump $C_1$.

Having set forth the piping as connected to the pump $C_1$, the function of the respective valving can now be discussed. This function will first be set forth in connecting a pump to the respective manifold pressure in station manifolds A and B. Secondly, the starting and stopping of a pump $C_1$ will be set forth emphasizing that valve manipulation need not occur. Finally, the isolation of pump $C_1$ together with the relieving of pressure from the pump will be set forth.

Assuming that pump $C_1$ has been shut down and repaired and needs to be brought on line between the respective station intake and discharge manifolds A and B, intake isolation valve 41 and discharge isolation valve 51 will be in the closed state. The respective vertical or steeply sloping lengths of pipe 42 on intake manifold A and 52 on discharge manifold B will form occluded or isolated sections of pipe from their respective manifolds from which the particulate matter of the slurry will have settled.

As other pumps will typically be on line, slurry will be flowing through the respective manifolds A and B.

It is required that the lengths of the respective piping 42 and 52 above each respective manifold A and B, meet two conditions. First, these lengths of line must be vertical or steeply sloping sections. This slope must be sufficient to permit all the particulate matter in the slurry to settle downwardly under the force of gravity to the respective manifolds A and B. Secondly, piping 42 and 52 must have a length and diameter sufficient to prevent ambient turbulence of the slurry in station manifolds A and B causing the particulate matter of the slurry to mix with the particle free fluid immediately adjacent to the isolation valves. Otherwise, such mixing immediately adjacent to the isolation valves may cause scouring of the valve sealing surfaces when these valves are first opened or "cracked" and cause the respective valves to wear and leak.

Note that a leaking of either of the isolation valves 41 and 51 causes the pressure in the respective intake manifold A and discharge manifold B to be connected to a pump such as pump $C_1$. Since the typical pressures in intake manifold A can be in the range of 100 pounds and in discharge manifold B can be in the range of 1,500 pounds, leakage of the isolation valves 41 and 51 can prevent access to an individual pump for repair due to the escape of fluid under high pressure. If leakage sufficient to prevent access to a pump for repair occurs, an entire pump station, such as that partially illustrated in FIG. 1, can be forced to be shut down.

The length of piping 42 or 52 can be algebraically described. Specifically, $L = 4KVd/\pi D^2$ where $Vd$ = volume of dampener, $D$ = diameter of pipe, $K$ = design factor considering the dampener volume occupied by gas during normal operation, the flow pattern and rate as a function of time in the pipe section 42 or 52, and a design safety allowance, $L$ = length of piping 42 and 52. Note: Consistent units must be used.

It should be appreciated that the length and slope of line L used from the station manifolds A or B to the isolation valves must be of sufficient length to prevent turbulence from fluid passing in these station manifolds from penetrating to the isolation valves. If the length and slope of the lines is not sufficient to prevent turbulent flow penetration into the occluded or dead end zones, some particle penetration can occur with valve erosion experienced as in the prior art.

Assuming that the respective intake isolation valve 41 and discharge isolation valve 51 have been closed for a sufficient period of time to permit particle settlement in line segments 42 and 52, connection of the pump $D_1$ to the respective manifolds A and B can occur. First, after the pump is filled with flushing water, flushing inlet valve 46 and drain valve 56 are moved to the closed position if they already are not in that state. Thereafter, intake isolation valve 51 is first opened. The fluid of the slurry free of the settled matter enters into the individual pump intake manifold 27. Charging of the volume of pulsation dampener $E_1$ at portion 33 across diaphragm 30 occurs. Gas is compressed in the bladder portion 34 of chamber 32.

When intake isolation valve 41 is first opened, fluid moves from intake pipe 42 rapidly across the isolation valve during opening. However, since this fluid is free of particulate matter, abrading of the valve does not occur. Once charging has occurred, fluid flow stops.

Discharge manifold B is connected to discharge side of pump $C_1$ at individual pump discharge manifold 28 by an analogous process. Discharge isolation valve 51 is "cracked", and fluid settled free of particles rushes from discharge pipe 52 to charge dampener $E_2$. Once charging has occurred, fluid flow stops.

It should be emphasized that in the case of discharge isolation valve 51, the problem of valve abrasion is more critical. Assuming pump $C_1$ was at atmospheric pressure and discharge manifold B was under a common discharge pressure of 1,500 pounds, a pressure differential in the order of 1,500 pounds exists across discharge isolation valve 51. Clearly, any particulate matter in the fluid can cause valve abrasion. Therefore, it is often times desirable to make the piping 52 to manifold B from discharge isolation valve 51 greater in length than piping 42 from manifold A to intake isolation valve 51.

Once connection of the pump $C_1$ across manifolds A and B has occurred, pump start up can follow. Typically, a motor D—such as shown in pump $C_1$ in FIG. 1—is activated. Drive 14 through transmission 16 effects reciprocating motion of the individual plungers 24. Pump $C_1$ comes on the line to transmit some of the slurry pipeline flow at a slurry station across the intake manifold A to the discharge manifold B.

However, it is a feature of this invention that the pump can remain in the "ready" condition indefinitely, thus simplifying and removing chance for malfunction in the final, critical, starting step.

It should be noted that as a result of this invention, the above described operation of valves 41 and 51 need only be performed when maintenance in the pump fluid chamber 20 to valves 21 and 22 or group 18 of plungers 24 or associated parts is performed. This invention allows the valves 41 and 51 to remain open during the many other operational and maintenance shutdowns. This was not the case in the prior art.

Considering the case where pump $C_1$ is stopped, and the isolation valves 41 and 51 are left open, particulate matter will settle from the respective vertical lengths of line 40 from station intake manifold A and vertical piping 50 from discharge manifold B. These respective pipings 40 and 50 will have the volume of fluid therein settle free of the particulate matter of the slurry. As the particulate matter of the slurry settles, it will be carried away by the flow of fluid in the respective station manifolds A and B.

It will be noted that the fluid in the length of piping 40 and 50, which settles free of particulate matter, is held to a minimum. This minimum length of pipe prevents substantial quantities of clear slurry fluid free of particulate matter from being introduced into the slurry flow when the pump is started. This, together with the appropriate setting of the rate of pump speed increase, in turn maintains the slurry passing through the station manifolds A and B in a substantially homogeneous mix.

In the prior art, where the respective lengths of piping between the pump and manifolds have contained substantial volumes of fluid free of particulate matter, resulting from the necessary flushing of the pump, the injection of this particle free fluid into manifold B has caused the slurry to become excessively diluted. Specifically, since the slurry would then have been injected with quantities of fluid free of particulate matter, settlement of the large slurry particles has occurred. Where resuspension of large slurry particles does not immediately occur, pipe blockage at any downstream constricted portions of the system has followed.

When it again becomes necessary to isolate pump $C_1$, the pump is first stopped. In the stopped state it is left with the respective intake isolation valve 41 and the outlet isolation valve 51 in the open position. In the open position, these respective valves permit particulate matter to settle out of them and the respective sloped lengths of pipes 40 and 50. Such settlement then permits particulate matter to fall free of section 40 in the intake side of pump $C_1$ and section 50 in the discharge side of pump $C_1$.

Once a sufficient time has followed to permit settlement, the respective intake isolation valve 41 and discharge isolation valve 51 may be closed if chamber 20 or adjacent areas must be opened for maintenance. These valves would then close against the slurry fluid essentially free of the particulate matter of the slurry.

After closure, flushing water inlet vlave 46 is opened. Similarly, drain valve 56 is opened. Flushing occurs.

Regarding drain valve 56, it can be immediately recognized that this valve does not "see" particulate matter. Rather, it "sees" only the slurry fluid.

In other cases, the preferred procedure may be as follows: (i) shut down pump and allow solids to settle from piping 40 and 50; (ii) close valve 41 and open flush valve 46; (iii) start the pump for an appropriate (short) period of time to clear all solids from the piping and pump into the discharge manifold B; (iv) close valve 46; (v) if fluid end maintenance is required, close valve 51; if not, then open valve 41 and the pump is ready to start.

It should be understood that it is the transmission of slurry which has contributed to the problems herein described. While pump installations having vertical runs of pipe are common, the critical vertical runs 40 and 50 and the respective placement of the intake and discharge isolation valves 41 and 51 above the respective station intake manifold A and discharge manifold B are critical in the slurry application here disclosed. Likewise, the connection of the drain valve 56 to a portion of the fluid whereupon draining of the discharge side of the pump and that volume of high pressure fluid from dampener $E_2$ is critical in that the drain valve must be placed where it encounters fluid free of particulate matter. Within these parameters, changes can be made. For example, a particular type of positive displacement pump herein illustrated is exemplary only, other types of positive displacement pumps—such as horizontal plunger pumps or double acting piston pumps—can as well be used.

What is claimed is:

1. Apparatus in a slurry pipeline station for pumping slurry containing particulate matter entrained in a fluid, said station having an intake manifold for receiving slurry from a slurry pipeline and at least one pump for passing slurry from said intake manifold to a discharge manifold and preventing back flow from said discharge manifold to said intake manifold and inlet and outlet piping for connecting said pumps to said respective inlet and outlet manifolds, the improvement in said inlet and outlet piping including: inlet piping to said pump from said inlet manifold having a slope and length sufficient to permit downward settlement of said particulate matter in said slurry, said length of inlet piping being above said intake manifold a sufficient distance to prevent turbulence in said fluid from causing substantial penetration of the particulate matter of said slurry above said length of inlet piping into an occluded passageway formed by said piping when said pump is stopped and fluid does not pass across said pump between said intake and discharge manifolds; an intake isolation valve above said length of inlet piping for closing and isolating the intake of said pump from said intake manifold against said fluid of said slurry upon settlement of said particulate matter from said fluid; outlet piping from said pump to said discharge manifold having a slope and length sufficient to permit downward settlement of said particulate matter of said slurry, said preselected length of outlet piping being above said discharge manifold a sufficient interval to prevent turbulence in said fluid from causing substantial penetration of the particulate matter of said slurry above said length of inlet piping into an occluded passage formed by said discharge piping when said pump is stopped and fluid does not pass across said pump between said discharge and intake manifolds; and an outlet isolation valve above said slurry penetration level for closing and isolating the outlet of said pump from said discharge manifold against said fluid of said slurry upon settlement of the particulate matter of said slurry.

2. The invention of claim 1 and including means between said discharge isolation valve and said pump in said discharge piping for draining said pump upon isolation by said discharge isolation valve.

3. The invention of claim 1 and including means between said intake isolation valve and said pump in said intake piping for introducing flushing fluid to said pump.

4. The invention of claim 1 and wherein said intake and discharge isolation valves are plug valves.

5. The invention of claim 1 and wherein said slurry station for pumping slurry includes a plurality of pumps.

6. A process of isolating pumps in a slurry pipeline station for pumping slurry containing particulate matter entrained in a fluid, said station having an intake manifold for receiving slurry from a slurry pipeline, a discharge manifold for discharging slurry to a slurry pipeline, and at least one pump for passing slurry from said intake manifold to said discharge manifold and preventing back flow from said discharge manifold to said intake manifold, said process comprising the steps of: providing inlet piping having a length of line and having a slope and length sufficient to permit downward settlement of the particulate matter in said slurry, said length of inlet piping being above said intake manifold a sufficient distance to prevent turbulence in said slurry from causing penetration of the particulate matter of said slurry above the length of inlet piping into an occluded passageway formed by said piping when said pump is stopped and fluid does not pass across said pump between said intake and discharge manifolds; providing an intake isolation valve above said length of inlet piping for closing and isolating the intake of said pump from said intake manifold against the fluid of said slurry upon the downward settlement of said particulate matter from said fluid; providing outlet piping from said pump to said discharge manifold, said outlet piping having a slope and length sufficient to permit downward settlement of said particulate matter of said slurry, said preselected length of outlet piping being above said discharge manifold a sufficient interval to prevent turbulence in said slurry from causing penetration of the particulate matter of said slurry above the length of inlet piping into an occluded passageway formed by said discharge piping when said pump is stopped and fluid does not pass across said pump between said discharge and intake manifolds; providing an outlet isolation valve above said slurry penetration level for closing said outlet piping and isolating the outlet of said pump from said discharge manifold against the fluid of said slurry upon settlement of the particulate matter of said slurry; stopping said pump so that fluid does not pass across said pump between said discharge and intake manifolds; waiting a predetermined period of time to permit said settlement of the particulate matter of said slurry from said inlet piping and outlet piping; and closing said isolation valves when said settlement has occurred.

7. The process of claim 6 and wherein said station has a plurality of pumps and said stopping step includes stopping one or more of said pumps, while other said pumps remain running.

* * * * *